Feb. 23, 1926.
W. AKEMANN
1,574,272
APPARATUS FOR DETERMINING THE TIME OF FLIGHT OF A PROJECTILE
Filed Sept. 3, 1920   2 Sheets-Sheet 1
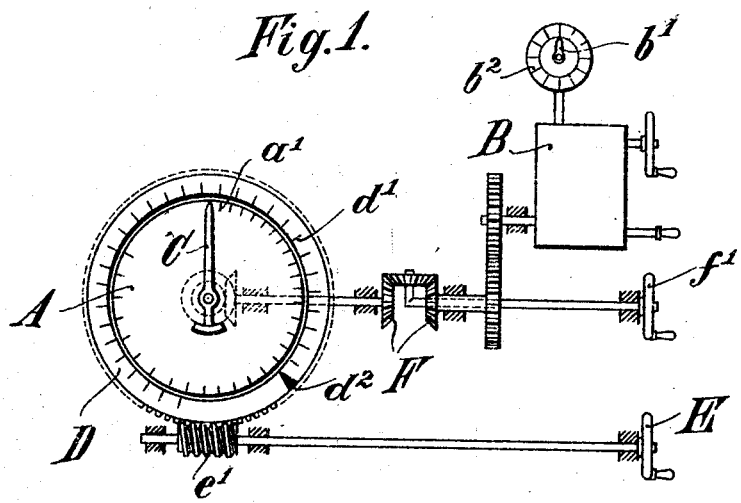
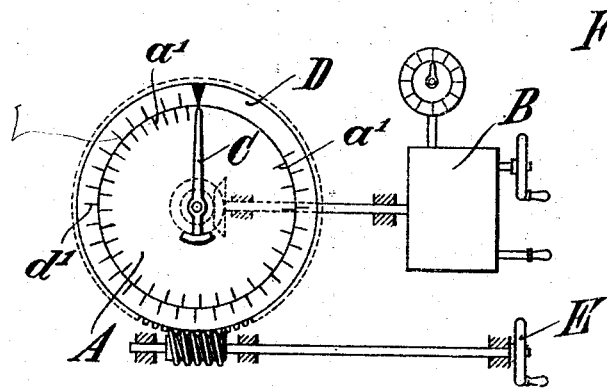
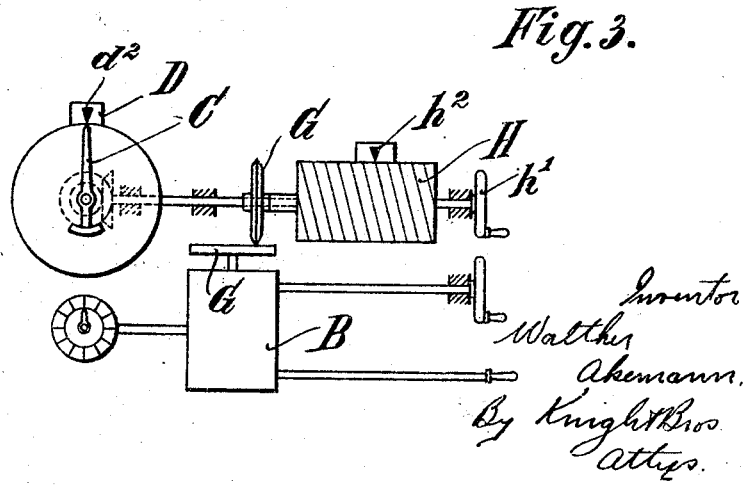

Feb. 23, 1926.                                                    1,574,272
W. AKEMANN
APPARATUS FOR DETERMINING THE TIME OF FLIGHT OF A PROJECTILE
Filed Sept. 3, 1920            2 Sheets-Sheet 2
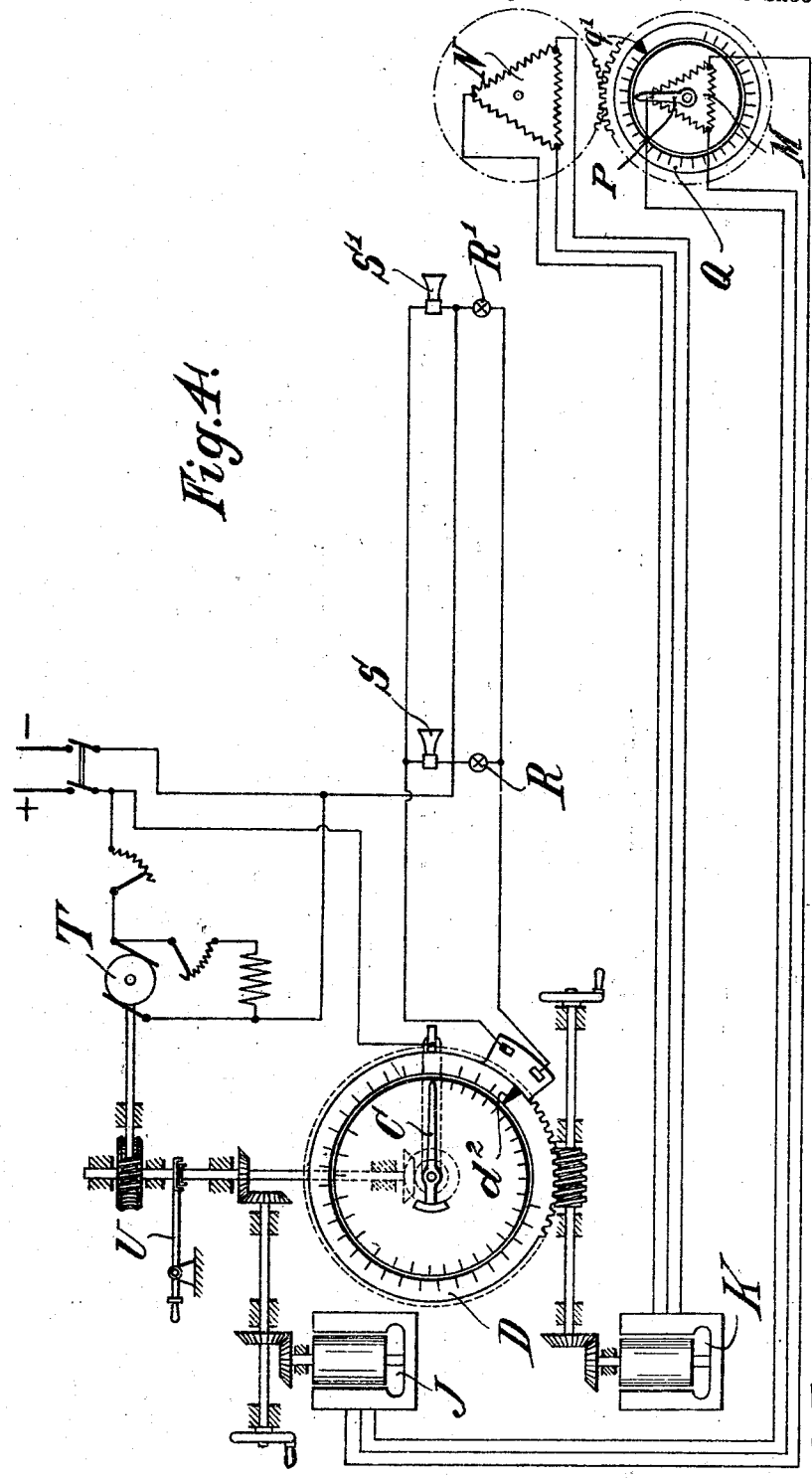

1,574,272

UNITED STATES PATENT OFFICE.

WALTHER AKEMANN, OF ESSEN, GERMANY, ASSIGNOR TO FRIED. KRUPP AKTIEN-GESELLSCHAFT, OF ESSEN-ON-THE-RUHR, GERMANY.

APPARATUS FOR DETERMINING THE TIME OF FLIGHT OF A PROJECTILE.

Application filed September 3, 1920. Serial No. 408,077.

*To all whom it may concern:*

Be it known that I, Dr. WALTHER AKEMANN, residing at Essen, Germany, a citizen of the German Republic, have invented a certain new and useful Improvement in Apparatus for Determining the Time of Flight of a Projectile, of which the following is a specification.

The apparatus for determining the period of time in which a projectile has passed over a course corresponding to the range of the target, which forms the subject matter of this invention, is designed to enable the observer of the target to only commence his observation shortly before the instant the projectile strikes, in order that he shall not be tired by an observation of unnecessarily long duration.

The invention will be described with reference to the accompanying drawings which show diagrammatically two embodiments of an apparatus constructed according to the invention. The embodiment represented by Fig. 1 shows an apparatus indicating at any instant the distance traversed by a projectile as well as the time still existing up to impact, while the embodiment represented by Fig. 2 differs from that shown in Fig. 1 in that it permits the reading off at any instant of the distance still to be traversed by the projectile and also the time still existing up to the instant of impact.

The apparatus shown in Fig. 1 consists broadly of a graduated disc A provided with a scale of graduations $a^1$, a pointer C, revolving over it and driven by a train of clockwork B and an angularly adjustable annulus D, adjustable by means of a handwheel E and a worm gearing $e^1$, the said annulus D being coaxial with the disc A and the pointer C. The annulus D has a seconds graduation $d^1$, the zero mark of which is marked $d^2$. The train of clockwork B is in connection with a second pointer $b^1$, which revolves over a dial $b^2$ and indicates the running time of the train of clockwork. The train of clockwork is also provided with the necessary arrangements for winding up and stopping it. Its movement is transmitted to the pointer C by a differential gear F, which enables the pointer C to be also set by hand by means of a hand wheel $f^1$.

The above described arrangement is used as follows:—

After the train of clockwork B has been wound up to such an extent that the pointer $b^1$ indicates on the dial $b^2$ at least a running time corresponding to the duration of the flight of the projectile, the graduated annulus D is so set, by turning the hand wheel E, that the zero mark $d^2$ of the seconds graduation stands opposite that graduation mark of the distance graduation $a^1$ which corresponds to the range of the target. The pointer C is then set in motion the instant the shot is fired by releasing the arresting device of the train of clockwork B. The pointer C indicates at any instant on the stationary distance graduation $a^1$ the distance traversed by the projectile and on the seconds graduation $d^1$ the time (in seconds) still existing up to impact. The observer therefore only requires to commence his observation of the target when the pointer C arrives in the vicinity of the mark $d^2$ corresponding to the range of the target and is consequently distant by only a few seconds from the instant of impact. After impact has taken place, the train of clockwork is stopped and the pointer C brought back to its original position by means of the hand wheel $f^1$.

The only difference between the constructional form shown in Fig. 2 and the one just described is that the graduated disc A provided with the distance graduation $a^1$ is in one piece with the adjustable graduated annulus D and that the distance graduation $a^1$ is inscribed in the opposite direction to the one shown in Fig. 1. The apparatus in this case is so constructed that the zero marks of the oppositely situated graduations $d^1$ and $a^1$ coincide and the numbering of the graduation marks runs in the same direction.

When using the apparatus shown in Fig. 2 the graduated annulus D which is in one piece with the disc A is first so set, by turning the hand wheel E, that the graduation mark of the distance graduation corresponding to the range of the target is opposite the pointer C (now in its initial position) and the train of clockwork then set in motion. The pointer C then moves towards the coinciding zero marks of the two graduations $d^1$ and $a^1$. By means of this arrangement the distance still to be traversed by the projectile and the time still existing up to the instant of impact can be read off at any moment.

In the third constructional form shown in Fig. 3, the mark $d^2$ with which the pointer C (driven by the train of clockwork B) coincides at the instant of impact, is inscribed on a stationary part D. There is also interposed between the train of clockwork B and the pointer C, a friction change speed gear G which can be adjusted to correspond to the range of the target. This change speed gear is adjusted by a hand wheel $h^1$, together with a distance drum H and the corresponding mark $h^2$. The apparatus is so constructed that after the change speed gear has been set to the range of the target, the pointer C is compelled to make just one complete revolution during the working of the train of clockwork, until the impact of the projectile takes place. The advantage of this arrangement is that the zero mark $d^2$, up to which the pointer C travels, is always located at the same point. For reading off the distance of the projectile at the moment from the target and the time of flight still existing a special arrangement (not shown with the present apparatus) is necessary. This special arrangement may also be entirely omitted. In such case the observer commences with the observation of the impact of the projectile when the pointer C is in a certain position determined by experience.

In the fourth constructional form shown in Fig. 4, an apparatus constructed according to this invention is located on the gun and worked by the crew of the gun. The pointer C, located on the gun, is driven by a continuous current motor T, thrown out of and into operation by means of a clutch U. Both the movement of the pointer C and that of the movable graduated annulus D is transmitted to transmitters J and K, which form parts of electrical distant indicating appliances. Synchronously working receivers M and N, set up where the observer is stationed, work in concordance with the transmitters J and K. The armature of the receiver M carries a pointer P, which corresponds to the pointer C, and works over an adjustable graduation Q provided with the zero mark $q^1$. The adjustment of the graduation Q is effected automatically by the armature of the receiver N. The coincidence of the pointer P with the zero mark $q^1$ must therefore take place at the same instant as the coincidence of the pointer C with the zero mark $d^2$. In order to warn the observer at the right time, signalling devices of the well-known kind are also provided, which act at certain relative positions between the pointer C and the graduated disc D. R denotes a lamp signal arranged at the gun and $R^1$ a lamp signal placed where the observer is stationed, which lights up the instant the pointer C coincides with the zero mark $d^2$, (that is to say at the instant in which the impact is to take place). S and $S^1$ each indicate in a corresponding manner an acoustical warning signal which sounds a few seconds before impact takes place and indicates to the observer of the impact that he must commence his observation of the target.

In the manner of its use the last described constructional form differs only little from the constructional form shown in Fig. 1. The principal difference is that all the necessary manual operations, i. e. the throwing into and out of operation of the motor T, the adjustment of the graduated annulus D, and the bringing back of the pointer C into its initial position, are performed at the gun, so that the observer can devote his attention undividedly to the indicating apparatus on the receivers M and N and to the signals R and S. By this means he is enabled to control several receiving appliances which belong to various arrangements constructed according to this invention.

There is naturally nothing to hinder so modifying the constructional form shown in Fig. 4 that the apparatus mounted at the gun shall be similarly constructed to the arrangements shown in Figs. 2 and 3. Furthermore instead of the continuous current motor any other suitable motor may be used to drive the pointer C.

Claims:

1. An apparatus of the class described comprising a member provided with range graduations, a concentrically arranged member provided with seconds graduations, a pointer concentrically arranged relative to both of said members, a clock-work mechanism for rotating said pointer at a predetermined speed over said range and time scale, and means for adjusting said time scale relatively to said pointer, said pointer being set in operation at the instant the shot is fired and indicating at any instant the local position of the projectile and the time still existing up to impact.

2. An apparatus of the class described comprising a member provided with range graduations, a concentrically arranged rotatable member provided with cooperating seconds graduations and provided with a zero mark, means for adjusting said time scale to position its zero mark opposite a point on said range scale corresponding to the distance of the target, a pointer and a clock work mechanism for rotating said pointer at a predetermined speed over said range and time scale, said pointer being set in operation the instant the shot is fired and indicating at any instant the distance traversed by the projectile and the time still existing up to impact.

3. An apparatus of the class described, a member provided with a scale graduated for range, a second member adjustable relatively to said first member and provided with a scale graduated for time, a movable pointer, means for rotating said pointer at a predetermined speed over said range and time scales, the zero mark of said range scale and said pointer coinciding in their initial position, means for adjusting said time scale to position its zero mark opposite the graduation of said range scale corresponding to the distance of the target, said pointer being set in motion at the instant the shot is fired and moving over said range and time scales toward the zero mark of said time scale and indicating at any instant the distance traversed by the projectile and the time still remaining up to impact.

4. In a device of the character described, a disk provided with graduations corresponding to range, a relatively adjustable annulus provided with graduations corresponding to time, a rotatable pointer traveling over said range and time scales, the zero mark of said range scale and said pointer coinciding in their initial position, means for rotating said pointer from its initial position at a predetermined speed, and means for adjusting said annulus to position its zero mark opposite a point on said range scale corresponding to the distance of the target whereupon said pointer may be set in motion at the instant the shot is fired to move toward the zero mark of said time scale whereby the pointer indicates at any instant on the range graduation the distance traversed by the projectile and on the time scale the time still existing up to impact.

5. In a device of the character described, a disk provided with graduations corresponding to range, a relatively adjustable annulus provided with graduations corresponding to time, a rotatable pointer traveling over said range and time scales, the zero mark of said range scale and said pointer coinciding in their initial position, means for rotating said pointer from its initial position at a predetermined speed, additional means for independently adjusting said pointer, and means for adjusting said annulus to position its zero mark opposite a point on said range scale corresponding to the distance of the target whereupon said pointer may be set in motion at the instant the shot is fired to move toward the zero mark of said time scale whereby the pointer indicates at any instant on the range graduation the distance traversed by the projectile and on the time scale the time still existing up to impact.

6. In a device of the character described, a disk provided with graduations corresponding to range, a relatively adjustable annulus provided with graduations corresponding to time, a rotatable pointer traveling over said range and time scales, the zero mark of said range scale and said pointer coinciding in their initial position, means for rotating said pointer from its initial position at a predetermined speed, and manually controlled means for adjusting said annulus to position its zero mark opposite a point on said range scale corresponding to the distance of the target whereupon said pointer may be set in motion at the instant the shot is fired to move toward the zero mark of said time scale whereby the pointer indicates at any instant on the range graduation the distance traversed by the projectile and on the time scale the time still existing up to impact.

The foregoing specification signed at Essen, Germany, this 14th day of May, 1920.

Dr. WALTHER AKEMANN.